United States Patent [19]
Tanner

[11] Patent Number: 4,970,248
[45] Date of Patent: Nov. 13, 1990

[54] GAMMA MODIFICATION OF AN AZINE PIGMENT

[75] Inventor: Martin Tanner, Tentlingen, Switzerland

[73] Assignee: Ciba-Geigy Corporation, Ardsley, N.Y.

[21] Appl. No.: 355,215

[22] Filed: May 22, 1989

[30] Foreign Application Priority Data

May 24, 1988 [CH] Switzerland ............ 1962/88

[51] Int. Cl.$^5$ .............. C09D 5/00; C09B 57/04; C08K 5/34; C07D 401/12
[52] U.S. Cl. ............... 524/94; 524/103; 546/6; 106/493; 106/497; 106/498; 548/105
[58] Field of Search ............ 546/6; 548/105; 534/575; 524/94, 103

[56] References Cited

U.S. PATENT DOCUMENTS

| | | | |
|---|---|---|---|
| 2,053,095 | 9/1936 | Maximoff | 534/575 |
| 3,346,551 | 10/1967 | Anton | 534/575 |
| 3,547,929 | 12/1970 | Wagener et al. | 546/56 |
| 3,928,315 | 12/1975 | Ribka | 534/575 |
| 4,614,547 | 9/1986 | Neeff et al. | 106/288 Q |
| 4,628,093 | 12/1986 | Neeff et al. | 546/6 |
| 4,721,745 | 1/1988 | Neeff et al. | 544/105 X |
| 4,722,737 | 2/1988 | Brandt et al. | 534/575 X |

FOREIGN PATENT DOCUMENTS 0074924 3/1983 European Pat. Off. ........ 106/288 Q

OTHER PUBLICATIONS

Biedermann, J. Soc. Dyes and Colourists, vol. 87, No. 4, pp. 105 to 111 (1971).

*Primary Examiner*—Floyd D. Higel
*Attorney, Agent, or Firm*—Stephen V. O'Brien

[57] ABSTRACT

Azine pigment which has one of the possible tautomeric forms of the formula I

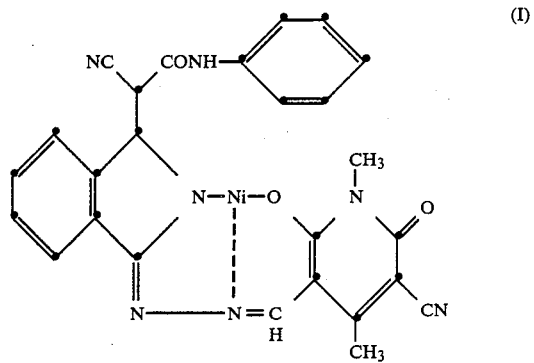

and which is present in its c-crystalline modification, which is characterized by the interplanar spacings (relative intensity) 3.29 (100); 3.60 (24); 3.73 (28); 4.64 (28); 6.23 (31); 6.97 (23); 8.05 (67); 9.36 (34); 12.63 (67); 13.96 (32) and 16.35 (30).

This pigment is excellently suitable for coloring high-molecular weight organic material, in particular automobile paints.

4 Claims, No Drawings

GAMMA MODIFICATION OF AN AZINE PIGMENT

The present invention relates to a novel stable crystalline modification (γ) of the 1:1-nickel complex of an isoindolineazine and to its use as a pigment.

The azine pigment of the formula I

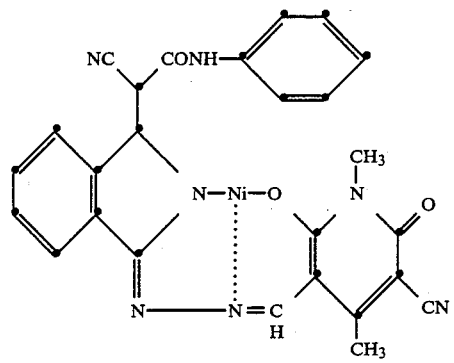

(I)

is known from EP-A 74,924 (Example 33).

Although this pigment is in general very suitable for pigmenting high-molecular weight material, it does not quite meet present-day requirements for certain applications, for example in automobile paints.

Two crystalline modifications of this pigment are known from EP-A 172,512. The c-modification, the X-ray diffraction diagram of which is characterized by the interplanar spacings (relative intensity) 2,893 (20); 3.0 (20); 3.24 (30); 3.34 (60); 3.44 (60); 3.74 (20); 3.92 (20); 6.49 (70); 9.70 (100); 10.11 (100) and 11.54 (90), can be converted, by thermal rearrangement, i.e. by heating the product for a prolonged period, preferably at 180° to 200° C., into the β-modification, the X-ray diffraction diagram of which is characterized by the interplanar spacings (relative intensity) 3.17 (20); 3.37 (25); 5.98 (20); 7.49 (60); 9.17 (60); 10.58 (50); 12.67 (100) and 13.33 (100); this modification is described as particularly suitable for use in automobile paints.

It has now been found, quite surprisingly, that a novel modification, designated γ, which is distinguished by excellent pigment properties and can also be recommended most satisfactorily for application in automobile paints, is obtained from the α-modification by kneading with salt or dry grinding with salt by customary methods and without heating. The present invention accordingly relates to an azine pigment which has one of the possible tautomeric forms of the formula I

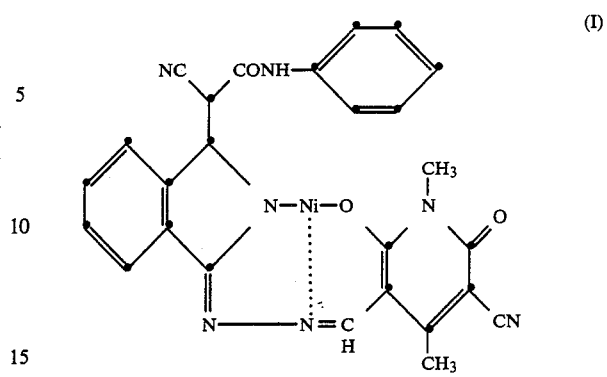

(I)

and which is present in its γ-crystalline modification, which is characterized by the interplanar spacings (relative intensity) 3.29 (100); 3.60 (24); 3.73 (28); 4.64 (28); 6.23 (31); 6.97 (23); 8.05 (67); 9.36 (34); 12.63 (67); 13.96 (32) and 16.35 (30).

The interplanar spacings quoted (d values in Å) are calculated from the lines having a relative intensity of at least 20 % of the corresponding DEBYE-SCHERRER diagrams (wavelength 1.54050 Å, Cu-K-alpha-1-radiation).

The γ-modification, according to the invention, of the azine pigment of the formula I is obtained, as already mentioned, by kneading with salt or dry grinding with salt the α-modification in accordance with methods generally customary for pigments, without heating. In spite of being prepared at room temperature, the γ-modification is distinguished by excellent heat stability. Kneading with salt in the presence of an organic solvent, such as ethylene glycol or diacetone alcohol, is particularly suitable. In the case of dry grinding it is possible to use as grinding agents, metal, glass or ceramic balls, nails, plastic granules or sand grains, in the manner generally customary for pigments. It is preferable to use sodium chloride, $CaCl_2$, $Na_2SO_4$ or $Al_2(SO_4)_3$ with or without water of crystallization as salts for kneading with salt or for dry grinding with salt. For example, 10 to 50 parts by weight of pigment are used for 100 to 150 parts by weight of salt. It can be advantageous in this connection to add to the grinding mixture small amounts of solvents, such as xylene or tetrachloroethylene, and/or surfactants, for example sodium or isopropylammonium dodecylbenzenesulfonate. Working up is effected by methods known per se, by separating the pigment/salt mixture from the grinding agents and putting it into water and then filtering off the pigment from the resulting suspension.

Although the pigment according to the invention has excellent application properties, it can be advantageous to add texture improving agents.

Examples of suitable texture improving agents are fatty acids having at least 12 C atoms, such as stearic acid or behenic acid, amides, esters or salts thereof, such as magnesium stearate, zinc stearate or aluminium stearate, or magnesium behenate, and also quaternary ammonium compounds, such as tri-($C_1$–$C_4$)-alkylbenzylammonium salts, and also plasticizers, such as epoxidized soya bean oil, waxes, such as polyethylene wax, resin acids, such as abietic acid, colophony soap, and hydrogenated or dimerized colophony, $C_{12}$–$C_{18}$ paraffindisulfonic acids, alkylphenols or alcohols, such as stearyl alcohol, and also laurylamine or stearylamine, and aliphatic 1,2-diols, such as dodecane-1,2-diol.

Preferred texture improving agents are laurylamine or stearylamine, aliphatic 1,2-diols, stearic acid, amides, salts or esters thereof, epoxidized soybean oil, waxes or resin acids.

Additives of this type can be added in amounts of 0.05 to 20, preferably 1 to 10, % by weight, relative to the pigment, before, during or after the kneading or grinding.

The pigment according to the invention is excellently suitable for dyeing high-molecular weight organic material.

Examples of high-molecular weight organic materials which can be coloured or pigmented with the pigment according to the invention are cellulose ethers and esters, such as ethylcellulose, nitrocellulose, cellulose acetate or cellulose butyrate, natural resins or synthetic resins, such as polymerization or condensation resins, such as aminoplasts, in particular urea-formaldehyde and melamine-formaldehyde resins, alkyd resins, phenoplasts, polyolefins, polystyrene, polyvinyl chloride, rubber, casein, silicone and silicone resins, on their own or as mixtures.

The pigment according to the invention is particularly suitable for colouring polyvinyl chloride and polyolefins, such as polyethylene and polypropylene, and for pigmenting paints and surface coatings, in particular automobile finishes.

The high-molecular weight organic compounds mentioned can be present on their own or in mixtures as plastic compositions or melts or in the form of spinning solutions, paints, surface coatings or printing inks. Depending on the intended use it proves advantageous to employ the pigment according to the invention as a toner or in the form of a preparation.

The pigment according to the invention can be employed in an amount of 0.01 to 30% by weight, preferably 0.1 to 10% by weight, relative to the high-molecular organic material to be pigmented.

The high-molecular weight organic substances are pigmented with the pigment according to the invention, for example, by admixing the pigment, if appropriate in the form of master batches, to these substrates using mixing rolls, mixing equipment or grinding equipment. The pigmented material is then brought into the desired final form by processes known per se, such as calendering, moulding, extruding, spread coating, casting or injection moulding. It is often desirable, in order to produce non-rigid shaped articles or to reduce the brittleness thereof, to incorporate so-called plasticizers into the high-molecular weight compounds before they are shaped. Esters of phosphoric acid, phthalic acid or sebacic acid, for example, can be used as plasticizers of this type. The plasticizers can be incorporated into the polymers before or after the solid solutions according to the invention are incorporated. It is also possible, in order to achieve different colour shades, to add to the high-molecular weight organic materials not only the pigment according to the invention but also fillers or other colouring constituents, such as white, coloured or black pigments, in any desired amounts.

For pigmenting paints, surface coatings and printing inks, the high-molecular weight organic materials and the pigment according to the invention, if appropriate together with additives, such as fillers, other pigments, siccatives or plasticizers, are made into a fine dispersion or dissolved in a common organic solvent or solvent mixture. A possible procedure for this is to disperse or dissolve the individual components on their own or several jointly and only then to combine all the components.

In colourations, for example of polyvinyl chloride or polyolefins and paints, the pigment according to the invention is distinguished by good general pigment properties, such as good dispersibility, high tinctorial strength and purity and good fastness to migration, heat, light and weathering. The following examples illustrate the invention.

EXAMPLE 1

(a) 17.8 g of N-methyl-2-hydroxy-4-methyl-5-cyano-pyrid-(6)-one-3-aldehyde-anil and 16.4 g of nickel acetate . 4H$_2$O in 500 ml of dimethylformamide are heated to 60° C. After 15 minutes 18.1 g of 1-(cyanophenylcarbamoylmethylene)-3-hydrazonoisoindolenine are added, and the reaction mixture is heated to 120° C. The mixture is stirred for 3 hours and the product is filtered off at 100° C. and washed with dimethylformamide and ethanol. After drying, 26 g (81% of theory) of the red pigment of the formula I are obtained.

The DEBYE-SCHERRER X-ray diffraction diagram is characterized by the interplanar spacings (relative intensity) 3.0 (20); 3.24 (30); 3.34 (60); 3.44 (60); 3.74 (20); 3.92 (20); 6.49 (70); 9.70 (100); 10.11 (100); and 11.54 (90) and corresponds to the α-modification.

(b) 20 g of the pigment synthesized in a) are kneaded in a conventional laboratory kneader with 2 g of hydrogenated abietic acid, 132 g of sodium chloride and 25 ml of diacetone alcohol for 16 hours. During this time a further 9 ml of diacetone alcohol are added in portions so that the composition remains kneadable. The kneaded composition is then stirred overnight in 3 1 of water, filtered off, washed free from salt with water and dried at 70° C. in a vacuum drying cabinet. 18.4 g of red pigment are obtained in the form of powder. The DEBYE-SCHERRER X-ray diffraction diagram of this powder is characterized by the interplanar spacings (relative intensity) 3.29 (100); 3.60 (24); 3.73 (28); 4.64 (28); 6.23 (31); 6.97 (23), 8.05 (67); 9.36 (34); 12.63 (67); 13.96 (32) and 16.35 (30) (γ-modification).

In order to determine the interplanar spacings (d values), the diffraction pattern is recorded on film. The recording is made in transmission with a Guinier camera (Enraf-Nonius FR 552 ®) and Cu-K-alpha-1 radiation (wavelength=1.54050 Å). The calibration substance used is quartz, the d values of which are calculated from a=4.913 Å and c=5.405 Å (PDF 5-490).

EXAMPLE 2

15 g of the pigment synthesized in Example 1a) (α-modification), 3 g of Na dodecylbenzenesulfonate (dissolved in 8 ml of tetrachloroethylene) and 135 g of aluminium sulfate are rolled for 72 hours at room temperature in a ball mill of capacity approx. one liter, containing as grinding agents 1,500 g of steel balls (φ 1.2 cm) and 150 g of nails (length 3 cm), on a roller stand. The ground mixture is then removed from the grinding agents and stirred for 3 hours at room temperature in a solution of 9 ml of concentrated sulfuric acid in 1500 ml of water. The product is filtered off, washed free from salt and neutral with water and dried at 70° C. in a vacuum drying cabinet. This gives 13.5 g of the same product as in Example 1b) but having a somewhat lower degree of crystallinity.

EXAMPLE 3

A mixture of
130 g of steatite balls (φ =8 mm),
47.5 g of a heat-curing acrylic lacquer consisting of
 41.3 g of acrylic resin Viacryl VC 373®, 60% (Vianova Kunstharz AG),
 16.3 g of melamin resin Maprenal TTX®, 55% (Hoechst AG),
 32.8 g of xylene,
 4.6 g of ethylglycol acetate,
 2.0 g of butyl acetate and
 1.0 g of Silicone oil A®, 1% in xylene (Bayer AG), and
2.5 g of the pigment obtained in Example 1b)
is dispersed in a 200 ml glass bottle with a "twist-off" closure for 72 hours on a roller stand. After the steatite balls have been removed, 8.0 g of the full-tone mixture dispersed in this way, 0.6 g of Alcoa® aluminium paste (60–65% Al content, Aluminium Corp. of America),
 1.0 g of methyl ethyl ketone and
 18.4 g of the above heat-curing acrylic lacquer
are thoroughly mixed, sprayed onto aluminium sheets and then stoved for 30 minutes at 130° C.

Very deeply coloured red metal effect coats of paint of excellent fastness properties are obtained.

EXAMPLE 4

25.2 g of Dynapol H 700® (polyester resin, 60% solution in Solvesso 150®, Dynamit Nobel), 2.7 g of Maprenal MF 650® (melamine resin, 55% solution in butanol, Hoechst), 15.5 g of cellulose acetobutyrate 531.1® (25% solution in 1:2 xylene/butyl acetate, Eastmen Chemical International), 1.1 g of Irgarol TZ6® (catalyst based on mineral oil and carboxylates, Ciba-Geigy), 23.3 g of butyl acetate, 11.6 g of xylene, 11.6 g of Solvesso 150® (aromatic solvent, Esso) and 9.0 g of the pigment obtained in Example 2 are thoroughly mixed for 96 hours in a ball mill, the pigment being made into a fine dispersion in the lacquer medium. The paint is then diluted with the above solvent mixture, butyl acetate/ xylene/Solvesso, to a flow viscosity of approx. 18 seconds (20° C.) as specified in DIN 4 and then applied to a metal sheet. After being exposed to the air for a short time (2 minutes at approx. 40° C.), this pigmented first-layer coating is covered with an unpigmented second-layer coating consisting of 58.3 g of Viacryl VC 373® (acrylic resin, 60% solution in xylene, Vianora), 27.3 g of Maprenal MF 590® (melamine resin, 55% solution in butanol, Hoechst), 1.0 g of Silicone oil A ® (1% solution in xylene, Bayer), 1.0 g of Tinuvin 900® (benzotriazole derivative, Ciba-Geigy), 5.4 g of xylene, 4.0 g of Solvesso 150® (ESSO) and 3.0 g of ethylene glycol acetate, exposed to the air for 30 minutes at 40° C. and then stoved for 30 minutes at 135° C.

A very deeply coloured red metal effect coat of paint with excellent fastness properties is obtained. It has a high gloss and an excellent distribution of the pigments.

We claim:

1. An azine pigment which has one of the possible tautomeric forms of the formula I

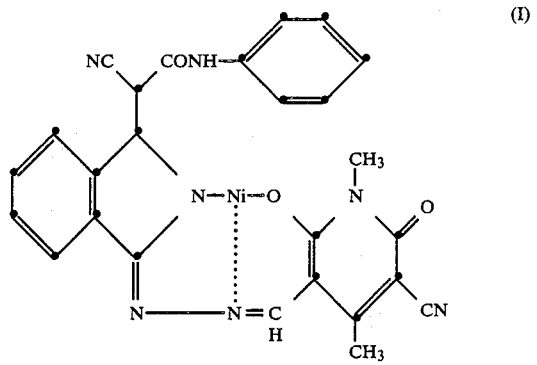

and which is present in its γ-crystalline modifications which is characterized by the interplanar spacings (relative intensity) 3.29 (100); 3.60 (24); 3.73 (28); 4.64 (28); 6.23 (31); 6.97 (23); 8.05 (67); 9.36 (34); 12.63 (67); 13.96 (32) and 16.35 (30).

2. A process for the preparation of the azine pigment of formula I in its γ-modification, according to claim 1, by kneading with salt or dry grinding with salt the o-modification without heating.

3. The process according to claim 2, which is carried out by kneading with salt in the presence of an organic solvent and using 100 to 150 parts by weight of a salt selected from NaCl, CaCl$_2$, Na$_2$SO$_4$ or Al$_2$(SO$_4$)$_3$ to 10 to 50 parts by weight of pigment.

4. A pigmented, high-molecular weight organic material containing, as the pigment, an azine pigment of the formula I in its y-modification according to claim 1.

* * * * *